(12) United States Patent
Kettunen et al.

(10) Patent No.: US 11,079,108 B2
(45) Date of Patent: Aug. 3, 2021

(54) FLUIDIZED BED BOILER PLANT AND A METHOD OF PREHEATING COMBUSTION GAS IN A FLUIDIZED BED BOILER PLANT

(71) Applicant: SUMITOMO SHI FW ENERGIA OY, Espoo (FI)

(72) Inventors: Ari Kettunen, Leppävirta (FI); Marko Ruuskanen, Varkaus (FI); Krister Sundqvist, Kuvansi (FI)

(73) Assignee: Sumitomo SHI FW Energia Oy, Espoo (FI)

( * ) Notice: Subject to any disclaimer, the term of this patent is extended or adjusted under 35 U.S.C. 154(b) by 0 days.

(21) Appl. No.: 16/633,429

(22) PCT Filed: Jul. 27, 2017

(86) PCT No.: PCT/FI2017/050555
§ 371 (c)(1),
(2) Date: Jan. 23, 2020

(87) PCT Pub. No.: WO2019/020864
PCT Pub. Date: Jan. 31, 2019

(65) Prior Publication Data
US 2020/0224874 A1    Jul. 16, 2020

(51) Int. Cl.
*F23L 15/04* (2006.01)
*F01K 13/02* (2006.01)
(Continued)

(52) U.S. Cl.
CPC .............. *F23L 15/04* (2013.01); *F01K 13/02* (2013.01); *F01K 7/22* (2013.01); *F01K 17/06* (2013.01); *F01K 23/062* (2013.01); *F23C 10/04* (2013.01)

(58) Field of Classification Search
CPC .. F23L 15/04; F01K 13/02; F01K 7/22; F01K 17/06; F01K 23/062; F23C 10/04; F23C 2900/10002; Y02E 20/34
(Continued)

(56) References Cited

U.S. PATENT DOCUMENTS 3,835,650 A    9/1974   Chesmejef
3,980,452 A *  9/1976   Krumm .................. F23M 20/00
                                                                48/215
(Continued)

FOREIGN PATENT DOCUMENTS

CN    201973708 U    9/2011
CN    103644564 A    3/2014
(Continued)

OTHER PUBLICATIONS

Notification of and International Search Report and Written Opinion dated Apr. 25, 2018, in corresponding International Patent Application No. PCT/FI2017/050555.
(Continued)

*Primary Examiner* — Hoang M Nguyen
(74) *Attorney, Agent, or Firm* — Venable LLP

(57) ABSTRACT

A fluidized bed boiler plant and a method of preheating combustion gas in a fluidized bed boiler plant. The boiler plant includes a furnace and a combustion gas channel, and a water-steam cycle including an evaporator section, a superheater section including a last superheater and a steam turbine, and a superheating path for conveying steam from the evaporator section via the superheater section to the steam turbine, and a first combustion gas preheater. The fluidized bed boiler plant includes a second combustion gas preheater, a steam extraction line attached in flow connection with the second combustion gas preheater and with the superheating path in a location upstream of the last super-
(Continued)

heater for conveying steam from the superheating path to the second combustion gas preheater.

16 Claims, 2 Drawing Sheets

(51) Int. Cl.
*F01K 7/22* (2006.01)
*F01K 17/06* (2006.01)
*F01K 23/06* (2006.01)
*F23C 10/04* (2006.01)

(58) Field of Classification Search
USPC .......................................... 60/653, 654, 681
See application file for complete search history.

(56) References Cited

U.S. PATENT DOCUMENTS

| | | | |
|---|---|---|---|
| 4,976,107 A | 12/1990 | Korpela | |
| 7,640,750 B2* | 1/2010 | Saviharju | F01K 3/247 60/653 |
| 7,690,201 B2* | 4/2010 | Kravets | F22B 1/1853 60/653 |
| 8,382,470 B2 | 2/2013 | Kinnunen | |
| 9,903,276 B2 | 2/2018 | Hotta | |
| 2009/0053661 A1 | 2/2009 | Kinnunen | |
| 2010/0050637 A1* | 3/2010 | Yamashita | B01D 53/1475 60/653 |
| 2011/0220038 A1 | 9/2011 | Kauppinen et al. | |
| 2012/0129112 A1 | 5/2012 | Cegarra Cruz et al. | |
| 2016/0003159 A1 | 1/2016 | Hotta | |
| 2016/0091197 A1* | 3/2016 | Nagano | F23L 15/02 122/441 |

FOREIGN PATENT DOCUMENTS

| | | |
|---|---|---|
| CN | 105026731 A | 11/2015 |
| CN | 105627300 A | 6/2016 |
| CN | 106402915 A | 2/2017 |
| CN | 206347560 U | 7/2017 |
| DE | 3111011 A1 | 2/1982 |
| EP | 0724683 B1 | 6/2000 |
| EP | 2372239 A2 | 10/2011 |
| GB | 747055 A | 3/1956 |
| JP | S5837422 B2 | 3/1983 |
| JP | S62175513 A | 8/1987 |
| JP | H10332106 A | 12/1998 |
| RU | 2328045 C2 | 6/2008 |
| WO | 1994019645 A1 | 9/1994 |
| WO | 2011076994 A1 | 6/2011 |

OTHER PUBLICATIONS

Russian Decision to Grant dated Jul. 31, 2020, issued in corresponding Russian Patent Application No. 2020107401.
Office Action dated Dec. 10, 2020, issued in Chinese Patent Application No. 201780093500.6.
Office Action dated Apr. 13, 2021, issued in Indian Patent Application No. 202047007674.

* cited by examiner

FLUIDIZED BED BOILER PLANT AND A METHOD OF PREHEATING COMBUSTION GAS IN A FLUIDIZED BED BOILER PLANT

CLAIM OF PRIORITY

This application is a U.S. national stage application of International Patent Application No. PCT/FI2017/050555, filed Jul. 27, 2017, now published as International Publication No. WO 2019/020864 A1 on Jan. 31, 2019.

BACKGROUND OF THE INVENTION

Field of the Invention

The present invention relates to a fluidized bed boiler plant and a method of preheating combustion gas in a fluidized bed boiler plant. More particularly, the invention relates to a fluidized bed boiler plant and a method of preheating combustion gas in a fluidized bed boiler plant enabling advantageous operation of the boiler plant with an especially low load.

Fluidized bed boilers are today often required to fulfill highly varying load demands, and, thereby, there is a need to operate the boilers also at very low loads. Conventional fluidized bed boilers typically have a minimum load of about 40% of the full load, but today it would often be desirable to operate a fluidized bed boiler at an even lower load of, say, about 20% to about 30% of the full load. Operating a conventional fluidized bed boiler at a very low load is usually prevented by the requirement to maintain the bed temperature in the furnace at a sufficient level to minimize emissions to the environment and to keep the steam temperature at a level required by the steam turbine. In order to maintain required minimum air volume flow through the fluidizing air nozzles, fluidized bed boilers are at low boiler loads often operated by an air coefficient that is higher than that with a full load, which tends to further decrease the furnace temperature.

A conventional method to maintain furnace temperature at an acceptable level in a low-load operation is to add refractory to the furnace, which, however, also increases the temperature level in the furnace during a full load operation. In order to limit the furnace temperature to a reasonable level at full load operation, recirculated flue gas is often fed to furnace with combustion air. This, however, brings about increased investment cost of the gas recirculation path and larger heat surfaces required due to greater total exhaust gas flow, and increased auxiliary power consumption in the recirculation gas fan and flue gas fan.

The efficiency of a conventional fluidized bed boiler is usually increased by preheating combustion air to a predetermined temperature, such as 250° C., in an air preheater, transferring heat from flue gas to the combustion air. Because low temperature air coming to the air preheater may cause condensation on the heat surfaces and corrosion in the air preheater, especially at low boiler loads, it is known to initially heat the incoming air by another source of heat, prior to the main air preheater. U.S. Pat. No. 3,835,650 suggests eliminating corrosion in the main air preheater by a steam air preheater, arranged in the combustion air channel upstream of the main air preheater, that is, using exhaust steam from a boiler feed pump turbine. German patent document DE 3 111 011 shows preheating combustion air by streams of bleed steam extracted from a steam turbine upstream of a regenerative main air preheater. Great Britain patent document GB 747,055 and Japanese patent document JP 62-175513 suggest initially preheating combustion air by boiler water at saturated steam temperature obtained from a steam drum.

International patent publication WO 2011/076994 A1 teaches indirectly preheating air in start-up and partial load situations by steam. Japanese patent document JP S58-37422 shows a steam type air preheater system that is capable to automatically control the combustion air temperature on the basis of changing load of the boiler. International document WO 2011/076994 A1 and Japanese document JP S58-37422 do not define the origin of the steam used for the air preheating. Japanese document JP H10-332106 teaches increasing plant efficiency in low loads by using turbine low pressure extraction steam as a heat source in a steam air heater. European patent document EP 0 724 683 B1, International patent document WO 94/19645 and U.S. Pat. No. 4,976,107 teach preheating combustion air solely by bleed steam extracted from a steam turbine. U.S. patent application publication No. 2012/0129112 A1 teaches preheating oxidant gas of a superheated steam producing oxyfuel combustion boiler by heat from a portion of the superheated steam.

An object of the present invention is to provide a fluidized bed boiler plant and a method of preheating combustion air in a fluidized bed boiler plant enabling efficient and economical operation of the boiler plant at different boiler loads, including very low boiler loads, while minimizing emissions to the environment and keeping the steam temperature at a level required by the steam turbine.

SUMMARY OF THE INVENTION

According to one aspect, the present invention provides a fluidized bed boiler plant comprising a furnace and a combustion gas channel for combusting fuel by combustion gas fed to the furnace through the combustion gas channel, and a water-steam cycle comprising an evaporator section, a superheater section in flow connection with the evaporator section comprising a last superheater and a steam turbine, and a superheating path for conveying steam from the evaporator section via the superheater section to the steam turbine, and a first combustion gas preheater arranged in the combustion gas channel for transferring heat to the combustion gas, wherein the fluidized bed boiler plant comprises a second combustion gas preheater arranged in the combustion gas channel, a steam extraction line attached in flow connection with the second combustion gas preheater and with the superheating path in a location upstream of the last superheater for conveying steam from the superheating path to the second combustion gas preheater so as to transfer heat from the steam to the combustion gas in the second combustion gas preheater.

According to another aspect, the present invention provides a method of preheating combustion gas in a fluidized bed boiler plant, the fluidized bed boiler plant comprising a furnace and a combustion gas channel for combusting fuel by combustion gas fed to the furnace through the combustion gas channel, and a water-steam cycle comprising an evaporator section, a superheater section in flow connection with the evaporator section comprising a last superheater, a steam turbine, and a superheating path for conveying steam from the evaporator section via the superheater section to the steam turbine, and a first combustion gas preheater arranged in the combustion gas channel, wherein the fluidized bed boiler plant comprises a second combustion gas preheater arranged in the combustion gas channel and a steam extraction line attached in flow connection with the superheating path in a location upstream of the last superheater and with the second combustion gas preheater, wherein the method of preheating combustion gas comprises transferring heat to the combustion gas in the first combustion gas preheater, conveying steam from the superheating path from a location upstream of the last superheater via the steam extraction line to the second combustion gas preheater, and transferring heat from the steam to the combustion gas in the second combustion gas preheater.

The combustion gas, in practice, combustion air or another oxygenous gas mixture, of a fluidized bed boiler, is conventionally preheated in a combustion gas preheater before being fed to the furnace of the boiler. A conventional combustion gas preheater, usually, a regenerative air preheater or a tubular air preheater, is arranged in the combustion gas channel, or more precisely, in connection with the combustion gas channel and a flue gas channel, to transfer heat from flue gas emanating from the furnace to the combustion gas. The combustion gas preheater can in some cases alternatively be of another type, such as a preheater transferring heat from the feed water to the combustion gas.

A main feature of the present invention is that the fluidized bed boiler plant comprises, in addition to a conventional combustion gas preheater, named hereafter as the first combustion gas preheater, also, a second combustion gas preheater. The first combustion gas preheater is advantageously a flue gas combustion gas preheater, i.e., a preheater transferring heat from the flue gas to the combustion gas, but it can alternatively be, for example, a feed water air preheater. The second combustion gas preheater is a steam combustion gas preheater, i.e., a preheater transferring heat from a flow of steam to the combustion gas. According to the present invention, the heat transferring steam is extracted from the superheating path via a steam extraction line, which steam extraction line is connected to the superheating path at a location upstream of the last superheater. The second combustion gas preheater is advantageously arranged in the combustion gas channel downstream of the first combustion gas preheater. Thereby, the temperature of the combustion gas may be increased in the second combustion gas preheater, for example, from 250° C. to 300° C.

The steam extraction line advantageously comprises a regulating valve for regulating steam flow in the steam extraction line. According to a preferred embodiment of the present invention, the additional air preheating defined above is used especially during the low-load operation. Thereby, the second combustion gas preheater is used, i.e., the regulating valve is opened so as to extract steam from the superheating path to the second combustion gas preheater, when it is desired to operate the fluidized bed boiler plant at a very low load, such as 20% to 30% of the maximum load.

As a result of the additional preheating of the combustion gas discussed above, more heat is introduced to combustion process via combustion air, and a higher furnace temperature is reached. Thus, it is possible to avoid too low bed temperatures, i.e., to maintain bed temperature in the furnace at a level desired to keep emissions to the environment at a low level, even at very low loads. Due to higher temperature of the combustion air, minimum velocity in combustion gas nozzles can be achieved with lower air mass flow, resulting in a lower air coefficient and, therefore, a higher furnace temperature. Because sufficient furnace temperature is reached in low boiler loads without a need for increased thickness of refractory in the furnace, the temperature can be maintained in high boiler loads at a suitable level without, or with decreased, flue gas recirculation. Therefore, the present invention makes it possible to operate the boiler at very low loads and decreases the operation and manufacturing costs for high load operation.

The combustion gas temperature alternatively could also be increased by other means than that defined above, for example, by transferring heat from feed water, boiler water, or bleed steam extracted from a steam turbine to the combustion gas. However, the use of steam extracted from the superheating path in a location upstream of the last superheater, according to the present invention, provides the additional advantage that steam flow in the last superheater, or all superheaters in the superheating path downstream of the steam extraction location, decreases. Thereby, the steam is superheated in the respective superheaters to a higher temperature than that without the steam extraction. The present invention thus also enables maintaining the final steam temperature, even at very low loads, at a level required by the steam turbine.

To avoid additional pressure loss in the combustion gas channel, the second combustion gas preheater can advantageously have a by-pass channel, through which the combustion gas is led when the second combustion gas preheater is not in use. Thereby, the by-pass channel and/or the channel branch leading to the second combustion gas preheater advantageously comprises a damper to control combustion gas flow in the respective channel portion.

The boiler plant may comprise multiple steam turbines, such as a high pressure steam turbine and a low pressure steam turbine, whereby the superheating path also comprises one or more steam reheaters. In that case, the final superheater is the final steam reheater, and the steam extraction line is connected to a location in the superheating path upstream of the final steam reheater. According to an advantageous embodiment of the present invention, the superheating path comprises multiple steam superheaters and multiple steam reheaters, and the steam extraction line comprises at least one branch connected to a location upstream of the final steam superheater and at least one branch connected to a location upstream of the final steam reheater. Especially advantageously, the steam extraction line comprises at least one branch connected to a location between two steam superheaters and at least one branch connected to a location between two steam reheaters. In case the superheating path comprises, for example, three in series connected steam superheaters, the steam extraction line advantageously comprises one branch connected to a location between the last two steam superheaters and a second branch connected to a location between the first two steam reheaters.

The present invention described above is in connection with a single combustion gas channel, but it is to be understood that the invention can as well be applied in connection with multiple combustion gas channels. Such multiple combustion gas channels may comprise, for example, a primary combustion gas channel and a secondary combustion gas channel, which both comprise a combustion gas preheating arrangement according to the present invention as described above.

Due to increased heat input to the furnace at low load, no additional refractory is needed in the furnace to maintain the temperature level. Therefore, less recirculating gas is needed with full load, resulting in lower auxiliary power consumption in the recirculation gas fan and flue gas fan. Due to lower total exhaust gas flow, i.e., flue gas flow and recirculation gas flow, less heat surface is needed to achieve appropriate flue gas end temperature, resulting in lower investment cost.

The above brief description, as well as further objects, features, and advantages of the present invention will be more fully appreciated by reference to the following detailed description of the currently preferred, but nonetheless illustrative, embodiments in accordance with the present invention, when taken in conjunction with the accompanying drawings.

DETAILED DESCRIPTION OF THE INVENTION

Figure 1:
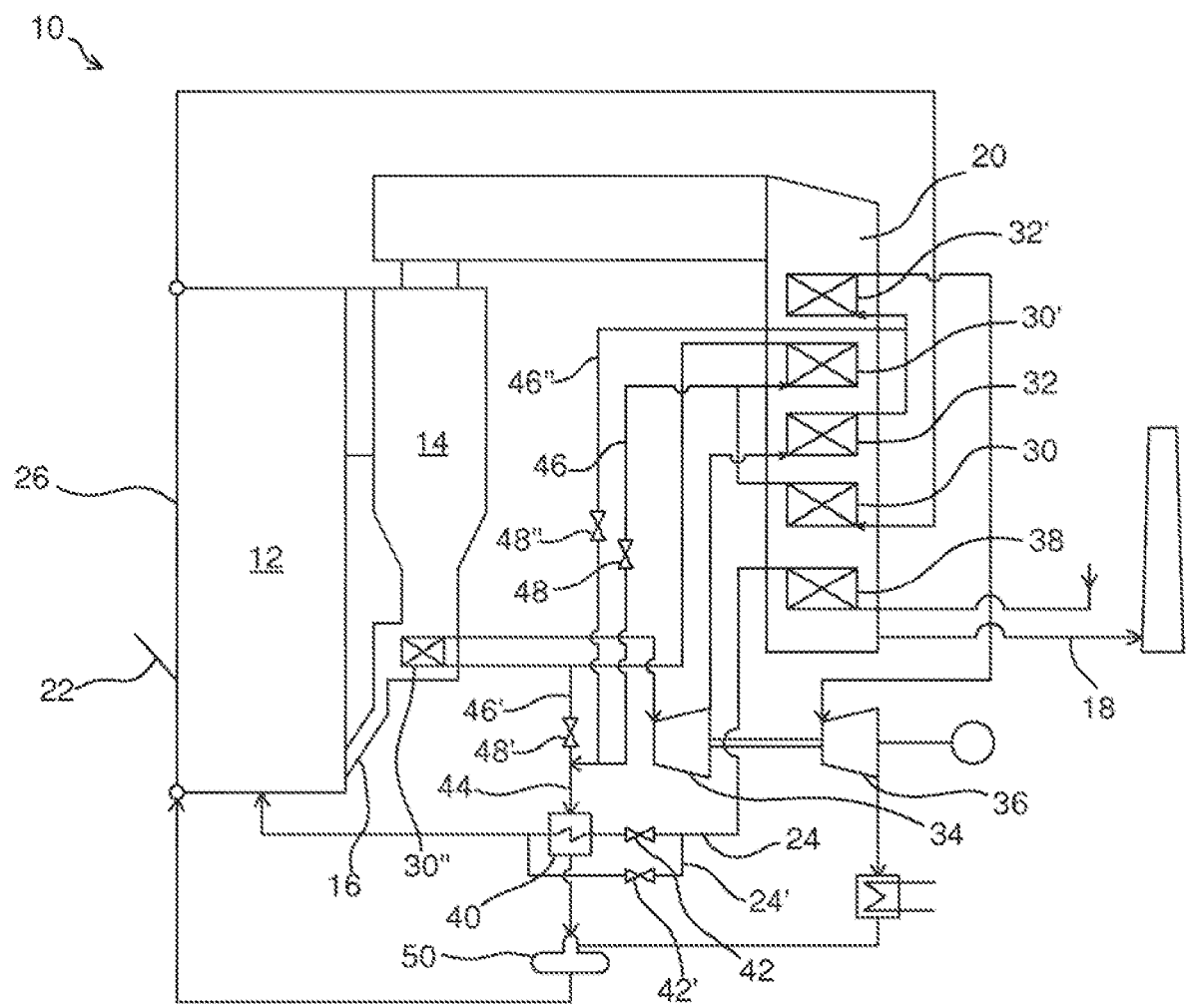
FIG. 1 schematically illustrates a fluidized bed boiler plant according to a preferred embodiment of the present invention.

The diagram of FIG. 1 schematically illustrates a fluidized bed boiler plant 10 according to a preferred embodiment of the present invention, the boiler plant 10 comprising a furnace 12, a cyclone separator 14 with a return leg 16, and a flue gas channel 18 with a heat recovery area 20. To the lower portion of the furnace 12 is connected a feeder 22 for feeding fuel to the furnace 12 and a combustion gas channel 24 for feeding combustion gas, such as air or other oxygenous gas, to combust the fuel and to fluidized bed particles in the furnace 12. The furnace 12 and the boiler plant 10 also comprise many other conventional elements, such as means for feeding sulfur binding agent or inert bed particles to the furnace, fans for conveying the flue gas and combustion gas, and equipment for cleaning the flue gas, which are, however, not shown in FIG. 1, because they are not relevant for the present invention.

Steam is generated in the once through boiler plant 10 in a water-steam cycle comprising an evaporator section 26 arranged in the enclosure walls of the furnace 12, a superheater section in flow connection with the evaporator section comprising multiple in series connected superheaters 30, 30', 30" and reheaters 32, 32'. The first and second of the superheaters 30, 30' and the reheaters 32, 32' are arranged in the heat recovery area 20, and the last superheater 30" is arranged return leg 16. However, as is well known to persons skilled in the art, the number and location of the superheaters and reheaters in the boiler plant 10 could also be different. Steam is conveyed from the evaporator section 26 via the superheaters 30, 30' and 30" to a high pressure steam turbine 34, and from the high pressure steam turbine 34 via the reheaters 32 and 32' to a low pressure steam turbine 36. In the following, the steam path from the evaporator section 26 to the last steam turbine is called a superheating path.

The heat recovery area 20 of the flue gas channel 18 also comprises a conventional first combustion gas preheater 38 for transferring heat from the flue gas to the combustion gas stream in the combustion gas channel 24. The first combustion gas preheater 38 is, in FIG. 1, depicted as a tubular air preheater, but it could also be, for example, a regenerative air preheater. It is also possible in some embodiments that the first combustion gas preheater 38 does not transfer heat from the flue gas, to the combustion gas but from another heat source, such as feedwater of the steam water cycle.

The fluidized bed boiler plant 10 shown in FIG. 1 also comprises a second combustion gas preheater 40 arranged in the combustion gas channel 24. The combustion gas channel 24 comprises a bypass channel 24' for bypassing the second combustion gas preheater 40. The branch of the combustion gas channel 24 leading through the second combustion gas preheater 40 as well as the bypass channel 24' comprises a regulating valve 42, 42', respectively, to regulate the ratio of the flows of combustion gas through the second combustion gas preheater 40 and through the bypass channel 24', respectively.

According to the present invention, combustion gas is preheated in the second combustion gas preheater 40 by steam extracted along a steam extraction line 44 from the superheating path in at least one location upstream of at least one superheater. In the embodiment shown in FIG. 1, the steam extraction line comprises a first branch 46 connected to the superheating line between the first and second superheaters 30, 30', a second branch 46' connected to the superheating line between the second and last superheaters 30', 30", and a third branch 46" connected to the superheating line between the first and second reheaters 32, 32'. Each of the first, second, and third branches 46, 46', 46" of the steam extraction line comprises a flow regulating valve 48, 48' and 48", respectively. In the embodiment shown in FIG. 1, the steam extracted from the superheating line and cooled in the second combustion gas preheater 40 is led to a feed water tank 50 of the steam-water cycle.

The second combustion gas preheater 40 is used especially when there is a need to operate the boiler plant at a very low load. Then, the flow regulating valve 42' in the bypass line 24' is closed and the flow regulation valve 42 is opened so as to allow the combustion gas heated in the first combustion gas preheater 38 to flow through the second combustion gas preheater 40. Simultaneously, at least one of the flow regulation valves 48, 48' and 48" is opened so as to allow steam extracted from the steam superheating line to flow to the second combustion gas preheater 40, and thereby to increase the temperature of the combustion gas.

Increased temperature of the combustion gas fed to the furnace 12 enables operation to maintain sufficient bed temperature in the furnace 12 and to keep emissions to the environment at a low level even at very low loads, i.e., when the rate of feeding fuel through the fuel feeder 22 and combustion gas through the combustion gas channel 24 are at a low level. A special advantage of the present invention is that, because combustion gas is heated by steam extracted from the superheating line upstream of the last superheater 30" and upstream of the last reheater 32', respectively, the steam is superheated and reheated to increased temperatures, which renders operation possible to maintain the temperature of the steam entering into the high pressure steam turbine 34 and the low pressure steam turbine, respectively, at a sufficiently high level.

The last mentioned advantage, which is especially important to be able to advantageously operate the boiler plant 10 at a very low load, is surprising and against common thinking of not using high level heat at a lower temperature level. However, the present inventors have noticed that because of the above mentioned two-fold advantages obtained by the present invention, it is in certain cases, i.e., when there is a need to operate the boiler at highly varying loads, beneficial to use superheated steam for preheating the combustion gas.

Figure 2:
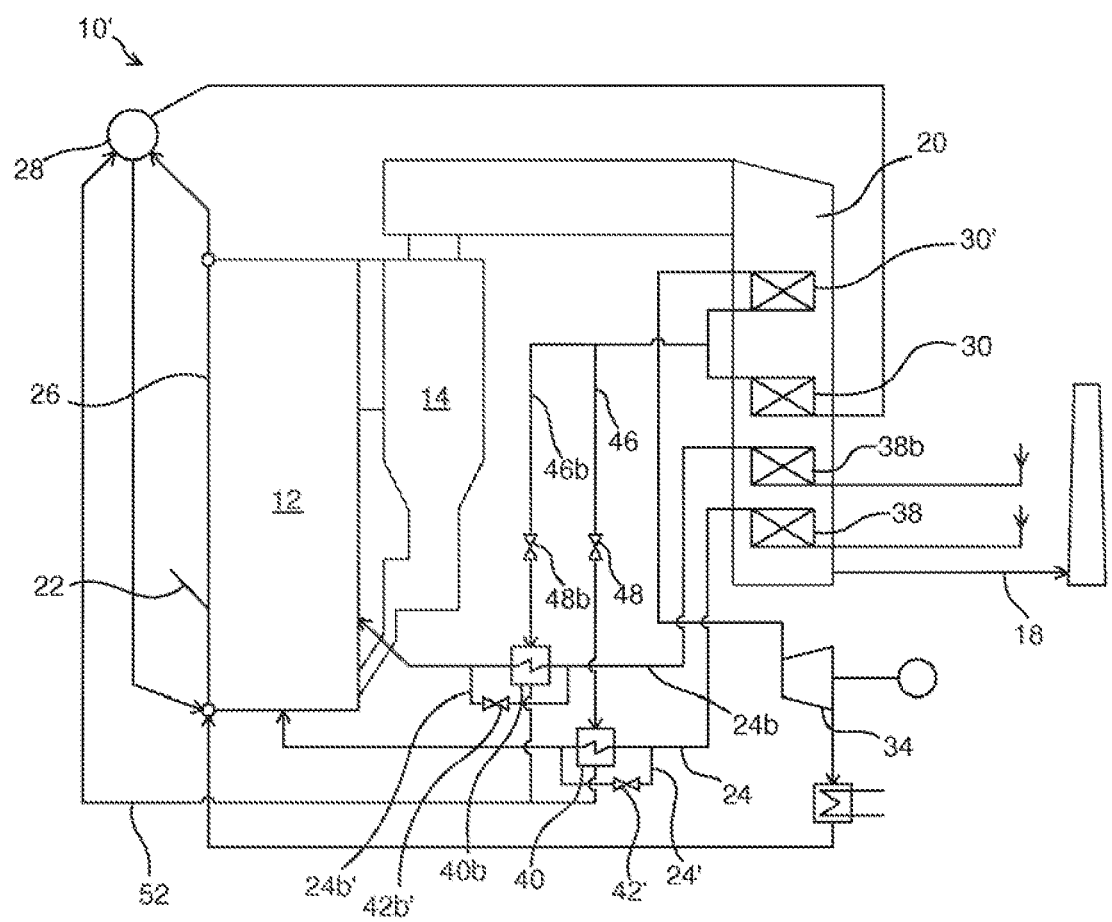
FIG. 2 schematically illustrates a fluidized bed boiler plant according to another preferred embodiment of the present invention.

The diagram of FIG. 2 schematically illustrates another preferred embodiment of the present invention. Similar features shown in FIGS. 1 and 2 are denoted by the same reference numbers, which are explained in connection with FIG. 1.

The embodiment of FIG. 2 differs from that shown in FIG. 1 in that the boiler 10' is, instead of a once through boiler, a drum boiler, wherein the water-steam cycle comprises a steam drum 28 between the evaporator section 26 and the superheater section. There is also only one steam turbine 34, and, in that the superheating path comprises only two superheaters 30, 30' arranged in the heat recovery area 20. The embodiment of FIG. 2 shows in addition to combustion gas channel 24 for providing primary air to the bottom of the furnace 12, also another combustion gas channel 24b for providing secondary air to a higher level in the furnace 12. Both combustion gas channels 24 and 24b comprise a first combustion gas preheater 38 and 38b, respectively, arranged in the heat recovery area 20.

Each of the combustion gas channels 24, 24b also comprises a second combustion gas preheater 40 and 40b, respectively. A bypass line 24', 24b' with a flow regulation valve 42', 42b' is arranged parallel to each of the second combustion gas preheaters 40, 40b. Heat is provided to each of the second combustion gas preheaters 40, 40b by superheated steam extracted from the superheating path via a respective steam extraction line 46 and 46b, which steam extraction lines are both connected to the superheating path at a location between the first and last superheaters 30 and 30'. As in the embodiment of FIG. 1, each of the steam extraction lines 46, 46b has a flow regulation valve 48, 48b. Cooled steam is conveyed from the second combustion gas preheaters 40, 40b via a return line 52 back to the steam drum 28.

FIGS. 1 and 2 show two preferred embodiments of the present invention, but, as is clear to a person skilled in the art, the invention also covers other embodiments. For example, the number of superheaters and reheaters may be greater or fewer than in these embodiments, the number of steam turbines may be even greater than two, and the number of different combustion gas channels, which all may comprise combustion gas preheaters according to the present invention, may be greater than two. Also, the individual features of the embodiment of FIG. 1 may also be used in the embodiment of FIG. 2, and vice versa, as suitable.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

The invention claimed is:

1. A fluidized bed boiler plant comprising:
   a furnace and a combustion gas channel for combusting fuel by combustion gas fed to the furnace through the combustion gas channel;
   a water-steam cycle comprising an evaporator section, a superheater section in flow connection with the evaporator section comprising a last superheater and a steam turbine, and a superheating path for conveying steam from the evaporator section via the superheater section to the steam turbine;
   a first combustion gas preheater arranged in the combustion gas channel for transferring heat to the combustion gas;
   a second combustion gas preheater arranged in the combustion gas channel; and
   a steam extraction line attached in flow connection with the second combustion gas preheater and with the superheating path in a location upstream of the last superheater for conveying steam from the superheating path to the second combustion gas preheater so as to transfer heat from the steam to the combustion gas in the second combustion gas preheater.

2. A fluidized bed boiler plant according to claim 1, wherein the second combustion gas preheater is arranged in the combustion gas channel downstream of the first combustion gas preheater.

3. A fluidized bed boiler plant according to claim 1, wherein the combustion gas channel comprises a bypass channel of the second combustion gas preheater in parallel with a portion of the combustion gas channel leading through the second combustion gas preheater.

4. A fluidized bed boiler plant according to claim 3, wherein at least one of the bypass channel and the portion of the combustion gas channel leading through the second combustion gas preheater comprises a regulating valve to regulate a ratio of the flows of combustion gas in the bypass channel and in the portion of the combustion gas channel leading through the second combustion gas preheater.

5. A fluidized bed boiler plant according to claim 1, wherein the steam extraction line comprises a regulating valve for regulating steam flow in the steam extraction line.

6. A fluidized bed boiler plant according to claim 1, wherein the superheating path comprises a first superheater, and the steam extraction line is in flow connection to the superheating path in a location between the first superheater and the last superheater.

7. A fluidized bed boiler plant according to claim 6, wherein the superheating path comprises a central superheater between the first superheater and the last superheater.

8. A fluidized bed boiler plant according to claim 7, wherein the steam extraction line comprises a first branch in flow connection to the superheating path in a location between the first superheater and the central superheater, and a second branch in flow connection to the superheating path in a location between the central superheater and the last superheater.

9. A fluidized bed boiler plant according to claim 8, wherein each of the first branch of the steam extraction line and the second branch of the steam extraction line comprises a regulating valve for regulating steam flow in the respective branch of the steam extraction line.

10. A fluidized bed boiler plant according to claim 1, further comprising a primary combustion gas channel and a secondary combustion gas channel, each of the primary and secondary combustion gas channels comprising a second combustion gas preheater.

11. A method of preheating combustion gas in a fluidized bed boiler plant, the fluidized bed boiler plant comprising a furnace and a combustion gas channel for combusting fuel by combustion gas fed to the furnace through the combustion gas channel, and a water-steam cycle comprising an evaporator section, a superheater section in flow connection with the evaporator section comprising a last superheater, a steam turbine, and a superheating path for conveying steam from the evaporator section via the superheater section to the turbine, a first combustion gas preheater arranged in the combustion gas channel, a second combustion gas preheater arranged in the combustion gas channel and a steam extraction line attached in flow connection with the second combustion gas preheater and with the superheating path in a location upstream of the last superheater, the method of preheating combustion gas comprising:
   transferring heat to the combustion gas in the first combustion gas preheater;

conveying steam from the superheating path from a location upstream of the last superheater via the steam extraction line to the second combustion gas preheater; and transferring heat from the steam to the combustion gas in the second combustion gas preheater.

12. A method of preheating combustion gas in a fluidized bed boiler plant according to claim 11, wherein the transferring of heat to the combustion gas is performed first in the first combustion gas preheater and then in the second combustion gas preheater.

13. A method of preheating combustion gas in a fluidized bed boiler plant according to claim 11, further comprising performing additional preheating of combustion gas by extracting superheated steam via the steam extraction line to the second combustion gas preheater during low load operation of the fluidized bed boiler plant.

14. A method of preheating combustion gas in a fluidized bed boiler plant according to claim 13, wherein the combustion gas channel comprises a bypass channel of the second combustion gas preheater in parallel with a portion of the combustion gas channel leading through the second combustion gas preheater, and at least one of the bypass channel and the portion of the combustion gas channel leading through the second combustion gas preheater comprising a regulating valve to regulate the ratio of the flows of combustion gas in the bypass channel and in the portion of the combustion gas channel leading through the second combustion gas preheater.

15. A method of preheating combustion gas in a fluidized bed boiler plant according to claim 14, further comprising controlling, in low load operation, the regulating valve so as to convey combustion gas through the second combustion gas preheater.

16. A method of preheating combustion gas in a fluidized bed boiler plant according to claim 13, wherein the steam extraction line comprises a regulating valve for regulating steam flow in the steam extraction line, and further comprising controlling, in low load operation, the regulation valve so as to convey steam through the steam extraction line to the second combustion gas preheater.

* * * * *